United States Patent Office 2,898,808
Patented Aug. 11, 1959

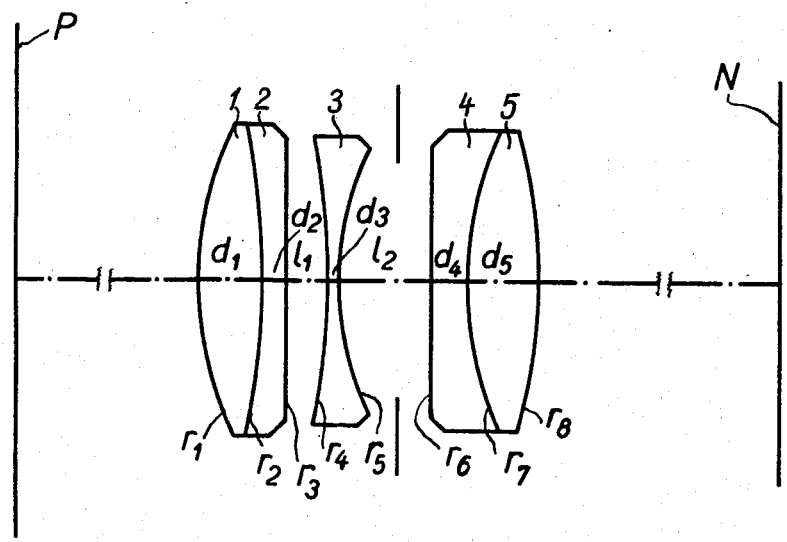

2,898,808

OBJECTIVE FOR ENLARGEMENTS

Carl Baur, Baldham, near Munich, and Christian Otzen, Munich, Germany, assignors to Agfa Camera-Werk Aktiengesellschaft, Munich, Germany Application December 13, 1956, Serial No. 628,061

Claims priority, application Germany December 17, 1955

7 Claims. (Cl. 88—57)

The present invention relates to an objective for photographic enlargements, and more particularly to an objective of the type including two outer members respectively consisting of a convergent element and a divergent element cemented to each other, and a middle member in the form of a bi-concave singlet arranged between the outer members.

It is known to use objectives of this type, for example the Tessar objective, for photographic enlargements. However, the objectives according to the known art produce pictures of good and uniform quality only within a small range of enlargement, and can be corrected only within a comparatively small region of the spectrum.

It is one object of the present invention to overcome the disadvantages of the known objectives used for enlargements, and to provide an objective for photographic enlargements having such improved picture quality that the image picture definition obtained by the objectives of modern cameras can be maintained within the entire range of enlargements.

It is another object of the present invention to provide an objective of this type in which aberration is corrected within a spectral region from 350 mu to 750 mu.

It is another object of the present invention to utilize for black and white enlargements sources, of cold light emitting considerable amounts of ultraviolet rays by extending the correction of the aberration through the corresponding spectral region.

It is another object of the present invention to utilize for color enlargements material whose sensitivity has been extended up to 720 mu.

A further object of the present invention is to provide, for enlargement purposes, objectives in which coma, chromatic aberration, astigmatism, spherical aberration, and distortion are geometrically and optically corrected to such an extent that an objective having a focal length approximately between 95 mm. and 105 mm. reproduces negatives of the size 6 cm. x 9 cm. within a range of enlargement between 1.5 and 6 in excellent picture quality, and that an objective having a focal length approximately between 50 mm. and 60 mm. reproduces negatives of the size 24 mm. x 36 mm. within a range of enlargement between 2 and 12 in excellent picture quality.

A further object of the present invention is to completely eliminate curvature of the image field which is particularly noticeable in the range of enlargement between 3 and 1.5 in known objectives of this type.

Yet another object of the present invention is to provide an objective in which the connection of chromatic aberration, and of lateral color aberration is so improved as compared with known objectives that a uniform excellent picture quality is obtained within the entire region of the spectrum between 350 mu and 750 mu.

With these objects in view the present invention mainly consists in an objective lens comprising, in combination, a first outer member having an outer face adapted to face the plane of the object, the first outer member being a cemented positive meniscus consisting of a convergent element and a divergent element cemented to each other, the radius of curvature of the inner face of the first outer member being greater than eight times and less than sixteen times the radius of curvature of the outer face of the first outer member; a second outer member axially spaced from the first outer member and having an outer face adapted to face the plane of the image, the second outer member being a cemented positive meniscus consisting of a convergent element and a divergent element cemented to each other, the radius of curvature of the inner face of the second outer member being greater than four times and less than eight times the radius of curvature of the outer face of the second outer member; and a middle member located intermediate the first and second outer members and being a bi-concave singlet.

By the above-defined construction of the objective according to the present invention the desired geometric and optic correction is obtained.

According to a preferred embodiment of the present invention the radius of curvature of the cemented faces of the first outer member has an absolute value greater than 1.9 times the radius of curvature of the outer face of the first outer member, and the quotient of the radii of curvature of the cemented faces of the outer members has an absolute value greater than 1.8 and less than 2.2.

In accordance with the present invention, the glasses of the lens elements have predetermined indices of refraction and dispersive indices for obtaining the desired high chromatic picture quality.

The present invention is particularly advantageously applied to an objective in which the axial air space between the bi-concave singlet and the first outer member is smaller than 0.6 times the axial air space between the bi-concave singlet and the second outer member, in which the radius of curvature of the less concave face of the bi-concave singlet has an absolute value greater than two times and smaller than three times the radius of curvature of the other concave face of said bi-concave singlet; in which the total axial length of the objective is greater than 0.22 times and smaller than 0.28 times the focal length of the objective as a whole; and in which the quotient of the sum of the axial thickness of the first and second outer members and of said bi-concave singlet divided by the sum of the axial air spaces of the objective is greater than 1.4 and smaller than 2.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing. The figure of the drawing shows a side view of an embodiment of the objective lens according to the present invention.

The objective lens according to the present invention comprises a first outer member located opposite and facing the object plane P, a second outer member located opposite and facing the image plane N, and a middle member which is separated from the outer members by axial air spaces $l_1$ and $l_2$ respectively. The first outer member is a positive meniscus and consists of a convergent element 1 having an axial thickness $d_1$ and of a divergent element 2 having an axial thickness $d_2$. The convex outer face of the convergent element 1 has a radius of curvature $r_1$, the inner face of the divergent element 2 has a radius of curvature $r_3$, and the elements 1 and 2 are cemented together along faces having a radius of curvature $r_2$.

The second outer member is a positive meniscus and consists of a convergent element 5 having an axial thickness $d_5$ and of a divergent element 4 having an axial thickness $d_4$. The convex outer face of the convergent element 5 has a radius curvature $r_8$, the inner face of the divergent element 4 has a radius of curvature $r_6$, and the elements 4 and 5 are cemented together along faces having a radius of curvature $r_7$.

The middle member is a bi-concave negative singlet having an axial thickness $d_3$, a concave face facing the plane of the object and having a radius of curvature $r_4$ and another concave face facing the plane of the image and having the radius $r_5$.

Referring to the drawing, the constructive principles of the objective to which the present invention preferably relates can be mathematically expressed as follows:

$$2r_5 < r_4 < 3r_5$$

$$l_1 < 0.6 l_2$$

$$0.22f < d_1 + d_2 + d_3 + d_4 + d_5 + l_1 + l_2 < 0.28f$$

$$1.4 < \frac{d_1 + d_2 + d_3 + d_4 + d_5}{l_1 + l_2} < 2.0$$

The constructive features by which the desired high picture quality is mainly obtained in accordance with the present invention may be mathematically expressed as follows:

$$8r_1 < r_3 < 16r_1$$

$$4r_8 < r_6 < 8r_8$$

The high chromatic picture quality within the region of the spectrum between 350 mu and 750 mu of the objectives according to the present invention is obtained by the following features:

(1) The divergent elements 2 and 4 and the bi-concave singlet 3 consist of glasses whose indices of refraction for yellow light (587.6 mu), that is for the D line of the spectrum, are smaller than 1.555, which can be mathematically expressed as follows:

$$n_2, n_3, n_4 < 1.555$$

(2) The arithmetic means of the dispersive indices $v$ of the respective glasses is greater than 47 and smaller than 52, which may be mathematically expressed as follows:

$$47 < \frac{v_2 + v_3 + v_4}{3} < 52$$

(3) The difference between the indices of refraction of the convergent element 1 and of the divergent element 2, and btween the indices of refraction of the convergent element 5 and the divergent element 4 is greater than 0.06 and less than 0.12, which may be mathematically expressed as follows:

$$0.06 < (n_1 - n_2) < 0.12$$

$$0.06 < (n_5 - n_4) < 0.12$$

(4) The differences between the dispersive indices of the convergent element 1 and of the divergent element 2, and between the dispersive indices of the convergent element 5 and the divergent element 4, are greater than eight and smaller than 14.5 which may be mathematically expressed as follows:

$$8 < (v_1 - v_2) < 14.5$$

$$8 < (v_5 - v_4) < 14.5$$

The radius of curvature $r_2$ of the cemented faces between the lens elements 1 and 2 has an absolute value greater than 1.9 times the radius of curvature $r_1$ of the outer face of the lens element 1 which faces the plane of the positive which may be mathematically expressed as follows:

$$1.9 r_1 < |r_2|$$

For further improving the correction of the objective it is important that the cemented faces between the lens elements 1 and 2, and between the lens elements 4 and 5, respectively, are constructed in such manner that the quotient of the respective radii of curvature has an absolute value greater than 1.8 and smaller than 2.2, which may be mathematically expressed as follows:

$$1.8 < \left|\frac{r_2}{r_7}\right| < 2.2$$

In addition to the above-described principles of construction for improving the geometrical and optical as well as the chromatic quality of the picture, the following additional constructive principles have been found to be advantageous.

The sum of the axial thicknesses $d_1$ and $d_5$ of the two convergent elements 1 and 5, as well as the sum of the axial air spaces $l_1$ and $l_2$, is greater than 0.08 times and smaller than 0.12 times the focal length of the objective as a whole which may be mathematically expressed as follows:

$$0.08f < (d_1 + d_5) < 0.12f$$

$$0.08f < (l_1 + l_2) < 0.12f$$

Furthermore, it is advantageous that the sum of the axial thicknesses of the divergent lens elements 2 and 4 is at least equal to the axial air space $l_1$ which may be mathematically expressed as follows:

$$(d_2 + d_4) \geq l_1$$

It is also advantageous that the sum of the axial thicknesses $d_1$ and $d_2$ of the lens elements 1 and 2 is smaller or equal to the sum of the axial thicknesses $d_4$ and $d_5$ of the lens elements 4 and 5 which may be mathematically expressed as follows:

$$(d_1 + d_2) \leq (d_4 + d_5)$$

When the above principles of construction are incorporated into the objective, the objective is uniformly corrected to such extent that it is hardly possible to improve the picture quality and definition of the fully open objective by a diaphragm reducing the aperture.

The following three examples are illustrative for objectives according to the present invention. The examples are based on a focal length $f = 1.000$ and on a relative aperture of 1:4.5.

*Example 1*

| Lens Elements | Radii | Thicknesses | $n_D$ | $v$ |
|---|---|---|---|---|
| 1 | $r_1 = +0.28168$ | $d_1 = 0.05244$ | $n_1 = 1.62041$ | $v_1 = 60.3$ |
|   | $r_2 = -0.62478$ | | | |
| 2 | | $d_2 = 0.01890$ | $n_2 = 1.54072$ | $v_2 = 47.2$ |
|   | $r_3 = +3.05899$ | | | |
|   | | $l_1 = 0.03496$ | | |
|   | $r_4 = -0.60216$ | | | |
| 3 | | $d_3 = 0.00699$ | $n_3 = 1.52310$ | $v_3 = 50.9$ |
|   | $r_5 = +0.24846$ | | | |
|   | | $l_2 = 0.06624$ | | |
|   | $r_6 = -2.43061$ | | | |
| 4 | | $d_4 = 0.02353$ | $n_4 = 1.52310$ | $v_4 = 50.9$ |
|   | $r_7 = +0.29333$ | | | |
| 5 | | $d_5 = 0.5481$ | $n_5 = 1.62041$ | $v_5 = 60.3$ |
|   | $r_8 = -0.44860$ | | | |

An objective according to the above table is illustrated in the drawings.

Example 2

| Lens Elements | Radii | Thicknesses | $n_D$ | $v$ |
|---|---|---|---|---|
| 1 | $r_1=+0.28203$ | $d_1=0.05251$ | $n_1=1.62041$ | $v_1=60.3$ |
| 2 | $r_2=-0.54359$ | $d_2=0.01892$ | $n_2=1.55115$ | $v_2=49.6$ |
|   | $r_3=+3.08834$ | $l_1=0.03028$ |   |   |
|   | $r_4=-0.62557$ |   |   |   |
| 3 | $r_5=+0.25097$ | $d_3=0.00700$ | $n_3=1.53172$ | $v_3=48.9$ |
|   |   | $l_2=0.05913$ |   |   |
|   | $r_6=-2.40416$ |   |   |   |
| 4 | $r_7=+0.29369$ | $d_4=0.02356$ | $n_4=1.52310$ | $v_4=50.9$ |
| 5 | $r_8=-0.44342$ | $d_5=0.05961$ | $n_5=1.62041$ | $v_5=60.3$ |

Example 3

| Lens Elements | Radii | Thicknesses | $n_D$ | $v$ |
|---|---|---|---|---|
| 1 | $r_1=+0.28162$ | $d_1=0.05735$ | $n_1=1.62041$ | $v_1=60.3$ |
| 2 | $r_2=-0.56585$ | $d_2=0.01398$ | $n_2=1.54814$ | $v_2=45.9$ |
|   | $r_3=+3.11532$ | $l_1=0.03023$ |   |   |
|   | $r_4=-0.62467$ |   |   |   |
| 3 | $r_5=+0.25061$ | $d_3=0.00699$ | $n_3=1.53172$ | $v_3=48.9$ |
|   |   | $l_2=0.05905$ |   |   |
|   | $r_6=-2.40070$ |   |   |   |
| 4 | $r_7=+0.29327$ | $d_4=0.02352$ | $n_4=1.52310$ | $v_4=50.9$ |
| 5 | $r_8=-0.44362$ | $d_5=0.05952$ | $n_5=1.62041$ | $v_5=60.3$ |

It will be understood that each of the elements described above, or two or more together, may also find a useful application in other types of objectives differing from the types described above.

While the invention has been illustrated and described as embodied in an objective for photographic enlargements comprising two outer cemented meniscus members and a biconcave singlet intermediate the outer members, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features, that, from the standpoint of prior art, fairly constitute essential characteristics of the generic or specific aspects of this invention and, therefore, such adaptations should and are intended to be comprehended within the meaning and range of equivalence of the following claims.

We claim:

1. An objective for photographic enlargements comprising, in combination, a first outer member having an outer face adapted to face the object plane, said first outer member being a cemented positive meniscus consisting of a convergent element and a divergent element cemented to each other, the radius of curvature of the inner face of said first outer member being greater than eight times and less than sixteen times the radius of curvature of the outer face of said first outer member, said radius of curvature of said outer face of said first outer member being between 0.28162 $f$ and 0.28203 $f$, $f$ being the focal length of the objective as a whole; a second outer member axially spaced from said first outer member and having an outer face adapted to face the image plane, said second outer member being a cemented positive meniscus consisting of a convergent element and a divergent element cemented to each other, the radius of curvature of the inner face of said second outer member being greater than four times and less than eight times the radius of curvature of the outer face of said second outer member, said radius of curvature of said outer face of said second outer member being between 0.44342 $f$ and 0.44860 $f$; and a middle member located intermediate said first and second outer members and being a biconcave singlet.

2. An objective for photographic enlargements comprising, in combination, a first outer member having an outer face adapted to face the object plane, said first outer member being a cemented positive meniscus consisting of a convergent element and a divergent element cemented to each other, the radius of curvature of the inner face of said first outer member being greater than eight times and less than sixteen times the radius of curvature of the outer face of said first outer member, and the radius of curvature of the cemented faces of said first outer member having an absolute value greater than 1.9 times the radius of curvature of said outer face of said first outer member, said radius of curvature of said outer face of said first outer member being between 0.28162 $f$ and 0.28203 $f$, $f$ being the focal length of the objective as a whole; a second outer member axially spaced from said first outer member and having an outer face adapted to face the image plane, said second outer member being a cemented positive meniscus consisting of a convergent element and a divergent element cemented to each other, the radius of curvature of the inner face of said second outer member being greater than four times and less than eight times the radius of curvature of the outer face of said second outer member, said radius of curvature of said outer face of said second outer member being between 0.44342 $f$ and 0.44860 $f$; and a middle member located intermediate said first and second outer members and being a biconcave singlet.

3. An objective for photographic enlargements comprising, in combination, a first outer member having an outer face adapted to face the object plane, said first outer member being a cemented positive meniscus consisting of a convergent element and a divergent element cemented to each other, the radius of curvature of the inner face of said first outer member being greater than eight times and less than sixteen times the radius of curvature of the outer face of said first outer member, said radius of curvature of said outer face of said first outer member being between 0.28162 $f$ and 0.28203 $f$, $f$ being the focal length of the objective as a whole; a second outer member axially spaced from said first outer member and having an outer face adapted to face the image plane, said second outer member being a cemented positive meniscus consisting of a convergent element and a divergent element cemented to each other, the radius of curvature of the inner face of said second outer member being greater than four times and less than eight times the radius of curvature of the outer face of said second outer member, said radius of curvature of said outer face of said second outer member being between 0.44342 $f$ and 0.44860 $f$, the quotient of the radii of curvature of the cemented faces of said first outer member and of said second outer member having an absolute value greater than 1.8 and less than 2.2; and a middle member located intermediate said first and second outer members and being a biconcave singlet.

4. An objective for photographic enlargements comprising, in combination, a first outer member having an outer face adapted to face the object plane, said first outer member being a cemented positive meniscus consisting of a convergent element and a divergent element cemented to each other, the radius of curvature of the inner face of said first outer member being greater than eight times and less than sixteen times the radius of curvature of the outer face of said first outer member, said radius of curvature of said outer face of said first outer member being between 0.28162 $f$ and 0.28203 $f$, $f$ being the focal length of the objective as a whole; a second outer member axially spaced from said first outer member and having an outer face adapted to face the image plane, said second outer member being a cemented positive meniscus consisting of a convergent element and a divergent element cemented to each other, the radius of curvature of the inner face of said second outer member being greater than four times and less than eight times the radius of curvature of the outer face of said second outer member, said radius of curvature of said outer face of said second outer member being between $0.44342 f$ and $0.44860 f$, the sum of the axial thicknesses of said convergent elements of said first and second outer members, and the sum of the axial air spaces between said first outer member and said middle member and between said second outer member and said middle member, respectively, being greater than 0.08 times and less than 0.12 times the focal length of the objective as a whole, the sum of the axial thicknesses of said divergent elements of said first and second outer members being at least equal to the axial air space between said first outer member and said middle member, and the total axial thickness of said second outer member being at least equal to the total axial thickness of said first outer member; and a middle member located intermediate said first and second outer members and being a biconcave singlet.

5. An objective for photographic enlargements and constructed substantially according to the specifications in the following table:

| Lens Elements | Radii | Thicknesses | $n_D$ | $v$ |
|---|---|---|---|---|
| 1 | $r_1=+0.28168f$ | $d_1=0.05244f$ | $n_1=1.62041$ | $v_1=60.3$ |
| 2 | $r_2=-0.62478f$ | $d_2=0.01890f$ | $n_2=1.54072$ | $v_2=47.2$ |
|   | $r_3=+3.05899f$ | $l_1=0.03496f$ | | |
|   | $r_4=-0.60216f$ | | | |
| 3 | $r_5=+0.24846f$ | $d_3=0.00699f$ | $n_3=1.52310$ | $v_3=50.9$ |
|   | $r_6=-2.43061f$ | $l_2=0.06624f$ | | |
| 4 | $r_7=+0.29333f$ | $d_4=0.02353f$ | $n_4=1.52310$ | $v_4=50.9$ |
| 5 | $r_8=-0.44860f$ | $d_5=0.05481f$ | $n_5=1.62041$ | $v_5=60.3$ | wherein the first column lists five lens elements in numerals in order from the plane of the positive to the plane of the negative; wherein the relative aperture is 1:4.5; wherein $f$ is the focal length of the objective, $n_D$ is the index of refraction for the D line of the spectrum, and $v$ is the dispersive index; and wherein $r$, $d$, and $l$ refer, respectively, to the radii of curvature of the refractive surfaces, the axial thicknesses of the lens elements, and the axial air spaces between the lenses, the subscripts on the characters $r$, $d$, and $l$ being numbered consecutively from the plane of the positive to the plane of the negative, the plus and minus signs in the second column corresponding to refractive surfaces which are respectively convex and concave to the plane of the positive.

6. An objective for photographic enlargements and constructed substantially according to the specifications in the following table:

| Lens Elements | Radii | Thicknesses | $n_D$ | $v$ |
|---|---|---|---|---|
| 1 | $r_1=+0.28203f$ | $d_1=0.05251f$ | $n_1=1.62041$ | $v_1=60.3$ |
| 2 | $r_2=-0.54359f$ | $d_2=0.01892f$ | $n_2=1.55115$ | $v_2=49.6$ |
|   | $r_3=+3.08834f$ | $l_1=0.03028f$ | | |
|   | $r_4=-0.62557f$ | | | |
| 3 | $r_5=+0.25097f$ | $d_3=0.00700f$ | $n_3=1.53172$ | $v_3=48.9$ |
|   | $r_6=-2.40416f$ | $l_2=0.05913f$ | | |
| 4 | $r_7=+0.29369f$ | $d_4=0.02356f$ | $n_4=1.52310$ | $v_4=50.9$ |
| 5 | $r_8=-0.44342f$ | $d_5=0.05961f$ | $n_5=1.62041$ | $v_5=60.3$ | wherein the first column lists five lens elements in numerals in order from the plane of the positive to the plane of the negative; wherein the relative aperture is 1:4.5; wherein $f$ is the focal length of the objective, $n_D$ is the index of refraction for the D line of the spectrum, and $v$ is the dispersive index; and wherein $r$, $d$, and $l$ refer, respectively, to the radii of curvature of the refractive surfaces, the axial thicknesses of the lens elements, and the axial air spaces between the lenses, the subscripts on the characters $r$, $d$, and $l$ being numbered consecutively from the plane of the positive to the plane of the negative, the plus and minus signs in the second column corresponding to refractive surfaces which are respectively convex and concave to the plane of the positive.

7. An objective lens for enlargements and constructed substantially according to the specifications in the following table:

| Lens Elements | Radii | Thicknesses | $n_D$ | $v$ |
|---|---|---|---|---|
| 1 | $r_1=+0.28162f$ | $d_1=0.05735f$ | $n_1=1.62041$ | $v_1=60.3$ |
| 2 | $r_2=-0.56585f$ | $d_2=0.01398f$ | $n_2=1.54814$ | $v_2=45.9$ |
|   | $r_3=+3.11532f$ | $l_1=0.03023f$ | | |
|   | $r_4=-0.62467f$ | | | |
| 3 | $r_5=+0.25061f$ | $d_3=0.00699f$ | $n_3=1.53172$ | $v_3=48.9$ |
|   | $r_6=-2.40070f$ | $l_2=0.05905f$ | | |
| 4 | $r_7=+0.29327f$ | $d_4=0.02352f$ | $n_4=1.52310$ | $v_4=50.9$ |
| 5 | $r_8=-0.44362f$ | $d_5=0.05952f$ | $n_5=1.62041$ | $v_5=60.3$ | wherein the first column lists five lens elements in numerals in order from the plane of the positive to the plane of the negative; wherein the relative aperture is 1:4.5; wherein $f$ is the focal length of the objective, $n_D$ is the index of refraction for the D line of the spectrum, and $v$ is the dispersive index; and wherein $r$, $d$, and $l$ refer, respectively, to the radii of curvature of the refractive surfaces, the axial thicknesses of the lens elements, and the axial air spaces between the lenses, the subscripts on the characters $r$, $d$, and $l$ being numbered consecutively from the plane of the positive to the plane of the negative, the plus and minus signs in the second column corresponding to refractive surfaces which are respectively convex and concave to the plane of the positive.

References Cited in the file of this patent

UNITED STATES PATENTS

| | | |
|---|---|---|
| 765,006 | Harting | July 12, 1904 |
| 1,421,156 | Booth | June 27, 1922 |
| 2,279,384 | Altman | Apr. 14, 1942 |
| 2,645,154 | Tronnier | July 14, 1953 |
| 2,764,062 | Lange | Sept. 25, 1956 |

FOREIGN PATENTS

| | | |
|---|---|---|
| 601,837 | Great Britain | May 13, 1948 |
| 1,126,860 | France | July 30, 1956 |